US006719148B2

United States Patent
Perälä

(10) Patent No.: US 6,719,148 B2
(45) Date of Patent: Apr. 13, 2004

(54) FILTER CLOTH AND REPLACEABLE FILTER MODULE

(75) Inventor: Aulis Perälä, Pirkkala (FI)

(73) Assignee: Tamfelt OYJ ABP, Tampere (FI)

( * ) Notice: Subject to any disclaimer, the term of this patent is extended or adjusted under 35 U.S.C. 154(b) by 0 days.

(21) Appl. No.: 09/986,422

(22) Filed: Nov. 8, 2001

(65) Prior Publication Data

US 2002/0053541 A1 May 9, 2002

Related U.S. Application Data

(63) Continuation of application No. PCT/FI00/00413, filed on May 9, 2000.

(30) Foreign Application Priority Data

Jun. 16, 1999 (FI) .................................................. 991381

(51) Int. Cl.$^7$ .............................................. B01D 39/08
(52) U.S. Cl. ........................ 210/490; 210/499; 210/507; 55/487; 55/488; 442/208
(58) Field of Search ................................ 210/458–491, 210/499, 497.01, 500.25, 502.27, 490, 506–507; 442/208–209; 428/36.1, 36.2; 29/896.1, 896.61, 896.62; 55/486–488, 527; 209/401

(56) References Cited

U.S. PATENT DOCUMENTS

| 3,086,242 A | * | 4/1963 | Cook et al. ................. 264/566 |
| 4,019,987 A | * | 4/1977 | Krasnow .................... 210/232 |
| 4,491,517 A | * | 1/1985 | Janovac ..................... 209/401 |
| 4,897,902 A | * | 2/1990 | Kavesh et al. ................ 28/166 |
| 5,180,409 A | * | 1/1993 | Fischer ........................ 55/486 |
| 5,221,008 A | * | 6/1993 | Derrick, Jr. et al. ......... 209/269 |
| 5,617,713 A | * | 4/1997 | Mawick et al. ................ 57/210 |
| 5,728,299 A | * | 3/1998 | Tokudome et al. ..... 210/497.01 |
| 5,843,542 A | * | 12/1998 | Brushafer et al. .......... 138/123 |
| 6,030,905 A | * | 2/2000 | Striegl et al. ............... 442/184 |
| 6,431,368 B1 | * | 8/2002 | Carr .......................... 209/403 |
| 2002/0066360 A1 | * | 6/2002 | Greenhalgh et al. ............. 87/8 |

FOREIGN PATENT DOCUMENTS

| SE | 431 826 | 3/1984 |
| WO | WO 02/05974 | * 1/2002 |

OTHER PUBLICATIONS

Merriam Webster Collegiate Dictionary (definition of cloth, p. 217), 10$^{th}$ edition, copywright 1998 by Merriam–Webster, Inc.*

Merriam–Webster Collegiate Dictionary (copywright 1998 by Merriam–Webster, Inc., 10$^{th}$ ed. p. 1370).*

* cited by examiner

Primary Examiner—W. L. Walker
Assistant Examiner—Marianne Ocampo
(74) Attorney, Agent, or Firm—Oliff & Berridge, PLC

(57) ABSTRACT

A filter cloth whose underside comprises substantially parallel, additional yarns that are thicker than the rest of the yarns of the cloth, substantially parallel channels being formed between the yarns, wherein filtered liquid that passed through the cloth, is allowed to flow in the direction of the surface of a filtering element between the filtering portion of the cloth and the surface of the element. The invention further relates to a filtering module manufactured from the filter cloth of the invention.

3 Claims, 1 Drawing Sheet

FILTER CLOTH AND REPLACEABLE FILTER MODULE

FIELD OF THE INVENTION

This application is a Continuation of International Application PCT/FI00/00413 filed on May 9, 2000 now is WO 00/76622 A1 published Dec. 21, 2000, which designated the U.S. and was published under PCT Article 21(2) in English.

The invention relates to filter cloth composed of a plurality of yarns in the transverse and the longitudinal directions, the filter cloth comprising a filtering portion having a structure and density according to desired filtering characteristics for separating liquid from a mixture consisting of solids and liquid, and which filter cloth is further to be arranged against a filtering element in a filtering apparatus, and the structure of the underside of the filter cloth, i.e. a portion facing the filtering element, comprises thicker yarns than a portion facing the upper side of the cloth for the flow of liquid filtered by the cloth.

The invention further relates to a filtering module to be arranged on a filtering element as a filtering surface when liquid is separated from a mixture consisting of solids and liquid by means of a filtering apparatus, which filtering module is made of filter cloth comprising a filtering layer composed of yarns in the transverse and the longitudinal directions, thicker yarns than the rest of the yarns of the cloth having been arranged while manufacturing the cloth in the bottom of the filter cloth for the flow of liquid.

BACKGROUND OF THE INVENTION

Different machine screens, such as disc filters and drum filters, are used for removing liquid from a mixture consisting of liquid and dry solids. A disc filter typically comprises a plurality of triangular filter segments arranged in a rotating frame onto which segments are arranged filter bags made of filter cloth. The liquid in the mixture to be filtered is allowed to penetrate through the filter cloth and further into a segment through openings extending to the surface of the filter segment. In addition to the segments, depending on the structure of the filter, different box-like and cylinder-like pieces and other elements are used onto which a bag or a similar filtering module made of filter cloth is stretched by means of different mechanical tightening parts or, nowadays increasingly often, by thermal contraction. It has been found out that if compact filter cloth is in use allowed to be pressed tightly against the surface of the filtering element, the flow of the passed liquid is hindered between the filtering cloth and the element to the openings of the element. In order to prevent this problem, a separate "additional wire bag" has been introduced between the actual filtering bag and the filtering element. The backing wire bag is made of a netlike texture forming a loose, highly permeable layer in the transverse direction of the surface of the cloth between the compact filtering bag and the surface of the element. Although such a separate backing wire bag does work relatively well in practice, fitting the backing wire bag is, however, an additional stage of operation. Furthermore, the manufacturing also causes additional costs.

SE 431 826 discloses filter cloth for separating solid particles and liquid, comprising at least two interwoven layers: a filtering layer and a supporting layer. In the supporting layer, i.e. in the portion facing the filtering element, thicker yarns are to be used in order to achieve a more coarse bottom. A drawback of the disclosed solution is, however, that the liquid that has already passed the filtering layer in the direction of the surface of the filtering element flows inside the supporting texture of the filter cloth. As normally, the texture comprises yarns travelling crosswise and having different directions, whereby the yarns form obstacles to an efficient flow of liquid.

SUMMARY OF THE INVENTION

An object of the present invention is to provide filter cloth and a filtering module manufactured from the same which avoid drawbacks of the known solutions.

The filter cloth of the invention is characterized in that the underside of the filter cloth comprises substantially parallel yarns that are thicker than the rest of the yarns of the cloth, and that the thicker yarns form parallel channels therebetween in order to enable the filtered liquid to flow in the direction of the surface of the filtering element between the filtering portion of the filter cloth and the filtering element.

The filtering module of the invention is further characterized in that the filtering module is manufactured from filter cloth whose underside, i.e. the surface to be against the filtering element, comprises substantially parallel yarns that are thicker than the rest of the yarns of the cloth, and that channels are formed between the thicker yarns, in which channels the liquid filtered by the cloth is allowed to flow in the direction of the surface of the filtering element.

The idea underlying the invention is that the filter cloth is produced such that while weaving the cloth, parallel, thicker yarns are arranged on the underside of the cloth, i.e. the surface facing the filtering element, the yarns forming therebetween parallel channels on the underside of the cloth to enable the filtered liquid to flow in the direction of the surface of the filtering element. The parallel, thicker yarns are additional yarns in regard to the rest of the structure of the filter cloth; hence, they are irrelevant to the rest of the structure of the cloth. Furthermore, the yarns used in the cloth that travel at the thicker yarns and have the same direction as the thicker yarns are preferably multifilaments, whereby they set tightly in the cloth in the vicinity of the monofilament, thicker yarns. Hence, the thicker yarns do not impair the density of the cloth. Furthermore, the filter cloth can be directed in the filtering module such that the flow channels on the underside of the cloth are located according to the positions of the openings, i.e. the channels direct the liquid to the openings. Owing to the thick yarns, the dense, filtering texture portion of the filtering module is located at a distance from the surface of the filtering element.

An advantage of the invention is that by manufacturing filter bags to be fitted onto different filtering elements and similar replaceable filtering modules from the filter cloth of the invention, the use of separate backing wire bags is avoided. Hence, it is easier and quicker to change the filter bags, and no further costs result from an additional bag. Furthermore, even thin filter cloth can be made stiff thanks to the thick yarns in the bottom of the cloth. A stiff filtering module stays better in place and thus lasts longer in use. Furthermore, the thick yarns in the bottom protect the actual filtering layer of the cloth, whereby sharp edges or the like of the filtering element cannot damage the cloth. In regard to the SE publication mentioned in the description of the prior art, the filter cloth of the invention can be more readily cleaned during use since dirt does not become clogged up in the open channels in the bottom of the cloth of the invention in such a manner as dirt can be clogged in different texture structures. A substantial advantage is that now the filtered liquid does not flow inside the texture structure but in the flow channels formed for the purpose, wherein there are no yarns in the transverse direction of the channels to block the flow. Furthermore, the flow of liquid can be directed in a desired manner when the filtering module is manufactured such that the parallel flow channels in the bottom of the filter cloth are arranged according to the positions of the openings and the operation of the filtering element. It is then possible to arrange the openings of the filtering element and the channels of the filter cloth in such a manner that liquid is allowed to enter the openings of the filtering element and further on as efficiently as possible. All in all, by using the filter cloth of the invention, the working costs of the filtering apparatus can be reduced and the filtering efficiency improved.

BRIEF DESCRIPTION OF THE FIGURES

The invention will be described in closer detail in the following drawings, in which FIG. 1 schematically shows the principle of a filtering apparatus wherein a filtering module manufactured from filter cloth of the invention can preferably be used, FIG. 2 schematically shows a structure of filter cloth of the invention, and FIG. 3 schematically shows a filtering module made of filter cloth of the invention, fitted onto a filtering element.

DETAILED DESCRIPTION OF THE INVENTION

Figure 1:
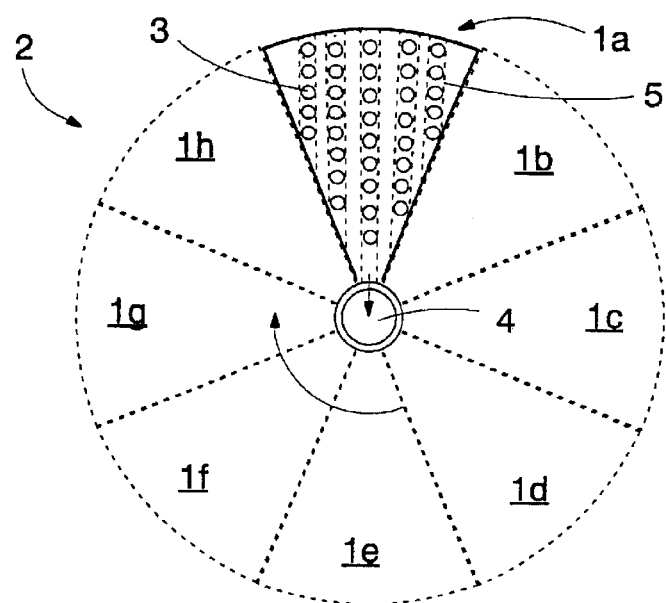

FIG. 1 is a simplified view of the principle of a disc filter 2 comprising a plurality of filtering segments 1a to 1h. The disc of the filter rotates in a basin (not shown) containing liquid and solids, whereby the liquid in the mixture passes through the filter cloth stretched over the segments. The solids then remain on the outer surface of the filter cloth, wherefrom the solids are removed by means of doctor blades, water jets or some such washing apparatus. The liquid that has passed the filter cloth flows to openings 3 provided in a filtering segment and therethrough further into the filtering element, from which it is directed forward via a duct 4. For the sake of clarity, the openings 3 are depicted highly enlarged in the figure. For the same reason, the other segments 1b to 1h are indicated in dotted lines and totally without openings. As can be seen from the figure, the openings have the same direction as the central axle of the segment but, of course, the openings can be arranged into lines having a different direction, or, alternatively, the entire filtering surfaces of the segment may be evenly provided with openings. When the openings are located according to the figure and the filtering module is formed according to the line formed by the openings, the flow channels formed by the thick yarns on the underside of the module have the same direction as the openings. For illustrative reasons, the direction of the thick yarns in the bottom of the module has been indicated in dotted lines 5 in the figure. When the openings and the flow channels are formed in this manner, the liquid that has passed through the cloth flows efficiently to the openings and further into the segment because of the rotation of the filtering apparatus and gravity.

Figure 2:
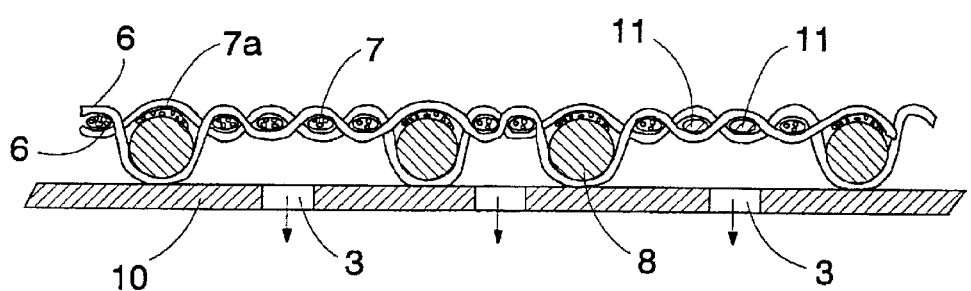

In a highly simplified manner, FIG. 2 shows a cross-sectional structure of filter cloth of the invention. The filter cloth according to the figure is single-layer filter cloth comprising warp yarns 6 and weft yarns 7. Furthermore, thicker yarns 8 having the direction of the weft have been woven on the surface of the bottom of the cloth. The thicker yarns are additional yarns, i.e. each thicker yarn has been arranged parallel to and against a weft yarn 7a located at the thicker yarn. The parallel, thicker yarns form flow channels 9 therebetween, whereby the liquid filtered by the cloth is allowed to flow via the channels and directed by the channels to the openings 3 provided in a filter element 10. The thicker yarns are monofilaments that are highly tolerant of compression. The warp and weft yarns, in turn, are multifilaments because they allow easier formation of a dense texture. Furthermore, in the cloth of the invention, they flatten out and become appropriately moulded at the thicker yarns, whereby the cloth becomes compact regardless of the thicker yarns in the bottom. This can be seen in FIG. 2 by examining particularly the weft yarns 7a located at the thicker yarns 8. Also spun yarn can be used in the filtering portion. Further, the structure may comprise other monofilament yarns than the thick yarns in the bottom. A monofilament having the same direction as the thick yarns and improving the stiffness of the cloth has been indicated in the figure by reference number 11. However, the parallel yarns adjacent to the thick yarns are, due to the compactness, preferably multifilaments or spun yarns. Thanks to the thicker yarns, the cloth is stiff even if the actual filtering layer were extremely thin. Thanks to a stiffer structure, the filtering module stays better in place regardless of the filtering and cleaning forces that it is subjected to, and, consequently, lasts longer. On the other hand, a thin filtering layer does not become clogged as easily as a thick layer, and it can be washed more readily. Furthermore, the thick yarns in the bottom protect the actual filtering layer e.g. in the corners of the filtering element wherein the filter cloth is subjected to high stress while being stretched.

FIG. 2 also shows that the thicker yarns 8 can be arranged at desired intervals in the cloth. The number of the thicker yarns in relation to the other parallel yarns in the bottom can be determined according to the use and the desired characteristics, e.g. stiffness, required of the cloth.

The filtering module can be stretched over the filtering element by means of different mechanical stretching parts known per se or the stretching can be carried out by thermal contraction, in which case at least some of the yarns of the filter cloth must be heat-shrinkable. In this connection, heat-shrinkable yarn refers to yarn used in manufacturing filter cloth that can be shortened by heating to such an extent that the resulting change in length can be utilized in a desired manner in order to stretch filter bags, filter wires or the like tightly in place. The stretching can be controlled by selecting the yarns appropriately. Since the thicker yarns only contract substantially in their longitudinal direction and not in relation to their diameter, the channels, while being contracted, substantially retain their shape; consequently, the contraction does not impair the flow of liquid. On the other hand, the thicker yarns do not have to be shrinkable; it is usually enough that the transverse yarns in relation to the thicker yarns are shrinkable. Also in such a case, the channels retain their structure regardless of the contraction.

Figure 3:
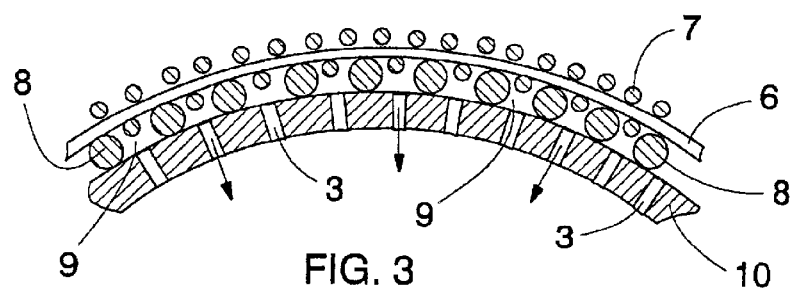

FIG. 3 is a sectional view of a part of a filtering module that has been fitted in place. In this case, the filtering element 10 is a cylinder, openings 3 having been provided through the surface of the cylinder. The thicker yarns 8 in the bottom of the cloth form channels 9 at the openings in the manner shown in the figure. For the sake of clarity, the two-layer filter cloth is shown in a highly simplified manner in the figure. It is believed in this connection that a person skilled in the art can select an appropriate bonding type, yarn material, yarn type, etc. The filter cloth can thus be a single- or multilayer texture and it can be made of yarns having a different cross section, as long as the yarn material is durable and has dimensional stability under the planned working conditions. Thick yarns per se do not affect the characteristics of the filtering layer, so in that sense they are additional yarns in the cloth. The diameter difference between the other yarns and the thicker yarns is preferably between 1:1.4 to 1:6, whereby a sufficiently large channel can be provided between the filtering layer of the cloth and the surface of the element as far as the flow of liquid is concerned. A person skilled in the art can determine the difference in thickness between the multi- and monofilaments by calculating, for example.

The drawing and the related description are only intended to illustrate the idea of the invention. In its details, the invention may vary within the scope of the claims. Hence, the actual filtering layer of the filter cloth can be formed by needling thickening batt into the body texture. The thickening effect can also be achieved by an appropriate coating layer to be arranged on the upper surface of the cloth. In principle, at least, it is also possible to use a body formed from non-woven yarn arrangements. Further, elements known as shrink wires to be arranged on different drum filters and the like can also be manufactured from the filter cloth of the invention. Furthermore, by directing the filter cloth appropriately, desired points of the module can be made stiff by means of the thick yarns in the bottom. Bent transversely to the thick yarns, the cloth is stiff, but when the cloth is bent in the direction of the thick yarns, it bends readily over a section between the thick yarns. In addition, the cloth can be manufactured such that the thicker yarns in the surface structure of the bottom of the cloth have, as distinct from what has been disclosed above, the same direction as the warp.

What is claimed is:

1. A filter cloth composed of a plurality of yarns in the transverse and the longitudinal directions, the filter cloth comprising a filtering portion having a structure and density according to desired filtering characteristics for separating liquid from a mixture consisting of solids and liquid, and which filter cloth is further to be arranged against a filtering element in a filtering apparatus, and an underside of the filter cloth, i.e., a portion facing the filtering element, comprises substantially parallel yarns that are thicker than the rest of the yarns of the cloth, and that the thicker yarns are placed at predetermined intervals defined by the other yarns of the filter cloth extending parallel thereto to form parallel channels therebetween to enable the filtered liquid to flow in the direction of the surface of the filtering element between the filtering portion of the filter cloth and the filtering element, wherein the thicker yarns are monofilaments, and that at least the yarns of the filter cloth that are parallel with the thicker yarns in the bottom and located at the thicker yarns are multifilaments, whereby the multifilament yarns have been moulded at the thicker yarns and thus form dense cloth also at the thicker yarns.

2. A filtering module to be arranged on a filtering element as a filtering surface when liquid is separated from a mixture consisting of solids and liquid by means of a filtering apparatus, which filtering module is made of filter cloth comprising a filtering layer composed of yarns in the transverse and the longitudinal directions, and an underside of the filter cloth, i.e., the surface to be against the filtering element, is comprised of substantially parallel yarns that are thicker than the other yarns of the filter cloth, and that channels are formed between the thicker yarns by the placement of the thicker yarns at predetermined intervals defined by the other yarns of the filter cloth extending parallel thereto, wherein the liquid filtered by the cloth is allowed to flow in the direction of a surface of the filtering element, wherein the thicker yarns are monofilaments, and that at least the yarns of the filter cloth that are parallel with the thicker yarns in the bottom and located at the thicker yarns are multifilaments, whereby the multifilament yarns have been moulded at the thicker yarns and thus form dense cloth also at the thicker yarns.

3. A filtering apparatus, comprising:

a filtering module; and a filtering element, wherein the filtering module is arranged on a filtering element as a filtering surface where liquid is separated from a mixture consisting of solids and liquid where, the filtering module is made of a filter cloth comprising a filtering layer composed of yarns in the transverse and the longitudinal directions, and an underside of the filter cloth, i.e. the surface to be against the filtering element, comprises of substantially parallel yarns that are thicker than the other yarns of the filter cloth, and channels are formed between the thicker yarns by the placement of the thicker yarns at predetermined intervals defined by the other yarns of the filter cloth extending parallel thereto, wherein the liquid filtered by the filter cloth is allowed to flow in the direction of a surface of the filtering element, wherein the thicker yarns are monofilaments, and that at least the yarns of the filter cloth that are parallel with the thicker yarns in the bottom and located at the thicker yarns are multifilaments, whereby the multifilament yarns have been moulded at the thicker yarns and thus form dense cloth also at the thicker yarns.

* * * * *